(12) United States Patent
Nguyen et al.

(10) Patent No.: US 12,149,343 B2
(45) Date of Patent: Nov. 19, 2024

(54) METHOD AND APPARATUS FOR ADAPTIVE ANTI-JAMMING COMMUNICATIONS BASED ON DEEP DOUBLE-Q REINFORCEMENT LEARNING

(71) Applicant: VIETTEL GROUP, Ha Noi (VN)

(72) Inventors: Phan Khanh Ha Nguyen, Ha Noi (VN); Viet Hung Nguyen, Ha Noi (VN); Van Long Do, Ha Noi (VN); Truong Xuan Do, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 444 days.

(21) Appl. No.: 17/537,506

(22) Filed: Nov. 30, 2021

(65) Prior Publication Data
US 2022/0209885 A1 Jun. 30, 2022

(30) Foreign Application Priority Data

Dec. 24, 2020 (VN) ............................... 1-2020-07502

(51) Int. Cl.
*H04K 3/00* (2006.01)
*G06N 3/045* (2023.01)
*G06N 3/08* (2023.01)

(52) U.S. Cl.
CPC .............. *H04K 3/226* (2013.01); *G06N 3/045* (2023.01); *G06N 3/08* (2013.01); *H04K 3/42* (2013.01)

(58) Field of Classification Search
CPC ............ H04K 3/226; H04K 3/42; H04K 3/00; H04K 3/20; H04K 3/28; G06N 3/045; G06N 3/08; G06N 7/01; G06N 3/006; G06N 3/084
See application file for complete search history.

(56) References Cited

PUBLICATIONS

Aref et al., Multi-task Deep Reinforcement Learning for Cognitive Spectrum-agile Communications, IEEE 14th International Conference on Industrial and Information Systems, Sri Lanka, pp. 284-289. (Year: 2019).*

(Continued)

*Primary Examiner* — Angelica Perez
(74) *Attorney, Agent, or Firm* — patenttm.us

(57) ABSTRACT

In order to avoid various jamming attacks from intelligent jammers in modern complex wireless environments, a system and method is presented for a user radio to generate and implement an adaptive anti-jamming communication strategy. The said adaptive anti-jamming communication strategy is obtained via the training process for a specific neural network using Deep Double-Q Reinforcement learning algorithm in the strategy generation phase. The objective of this process is to discover a strategy to select the optimal radio action including transmission channel and transmission power for the user radio, which is changed adaptively to different jamming patterns to maximize the successful transmission rate ("jamming-free") while retaining the power consumption of user radio as low as possible. In the strategy implementation phase, the user radio chooses an appropriate radio action based on output of trained neural network after the training process; thus, achieves robust and efficient communications against diverse complex jamming scenarios.

3 Claims, 7 Drawing Sheets

(56) References Cited

PUBLICATIONS

Aref et al., Robust Deep Reinforcement Learning for Interference Avoidance in Wideband Spectrum, IEEE, 2019, 5 pages. (Year: 2019).*

Ye et al., Greedy Reinforcement Learning for Anti-Jamming Wireless Communications, IEEE Xplore, 2020, 6 pages. (Year: 2020).*

International Journal of Adhoc and Ubiquitous Computing, 2014, vol. 17, No. 4, pp. 197-215, "Jamming and Anti-Jamming Techniques in Wireless Networks: A Survey," K. Grover, A. Lim, and Q. Yang.

IEEE Communications Survey & Tutorials, 2009, vol. 11, No. 4, pp. 42-56, "A Survey on Jamming Attacks and Countermeasures in WSNs," A. Mpitziopoulos, D. Gavalas, C. Konstantopoulos, and G. Pantziou.

IEEE Journal on Selected Areas in Communications, 2011, vol. 30, No. 1, pp. 4-15, "An Anti-jamming Stochastic Game for Cognitive Radio Networks," B. Wang, Y. Wu, K. J. R. Liu, and T. C. Clancy.

IEEE Wireless Communications, 2018, vol. 25, No. 6, pp. 120-128, "Stackelberg Game Approaches for Anti-jamming Defence in Wireless Networks," L. Jia, Y. Xu, Y. Sun, S. Feng, and A. Anpalagan.

International Congress of Information and Communication Technologies (ICICT), 2018, pp. 1023-1031, "Intelligent Anti-jamming Communication based on the Modified Q-learning," C. Han, Y. Niu, T. Pang, and Z. Xia.

IEEE Conference on Communications and Network Security (CNS), 2013, pp. 28-36, "Competing Mobile Network Game: Embracing Anti-jamming and Jamming Strategies with Reinforcement Learning," Y. Gwon, S. Dastangoo, C. Fossa, and H. T. Kung.

IEEE Wireless Communications and Networking Conference (WCNC), 2015, pp. 293-298, "Anti-jamming Transmissions with Learning in Heterogeneous Cognitive Radio Networks," T. Chen, J. Liu, L. Xiao, and L. Huang.

AAAI Conference on Artificial Intelligence, 2016, pp. 2094-2100, "Deep Reinforcement Learning with Double Q-learning," H. V. Hasselt, A. Guez, and D. Silver.

Mathematics of Computation Journal, 1965, vol. 19, No. 90, pp. 297-301, "An Algorithm for the Machine Calculation of Complex Fourier Series," J. W. Cooley and J. W. Tukey.

Asilomar, 1997, pp. 877-881, "Automatic Noise Floor Spectrum Estimation in the Presence of Signals," M. J. Ready, M. L. Downey and L. J. Corbalis.

IEEE EUSIPCO, 2020, pp. 1566-1570, "A Deep Double-Q Learning-based Scheme for Anti-Jamming Communications," Phan Khanh Ha Nguyen, Viet Hung Nguyen and Van Long Do.

\* cited by examiner

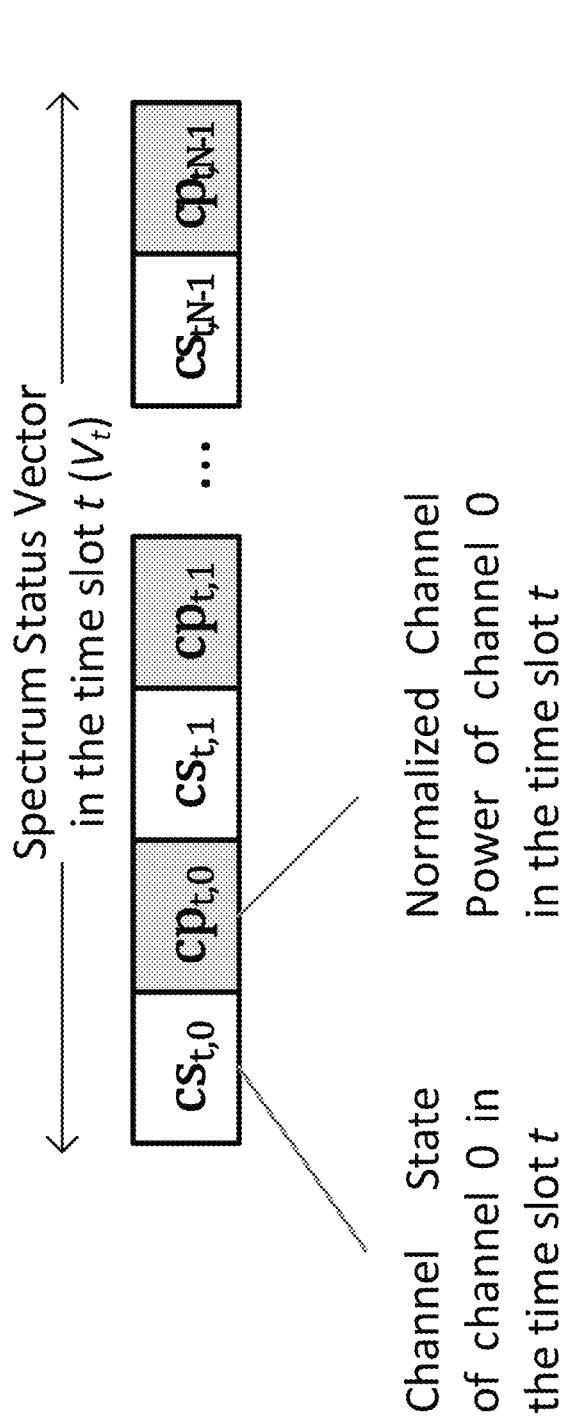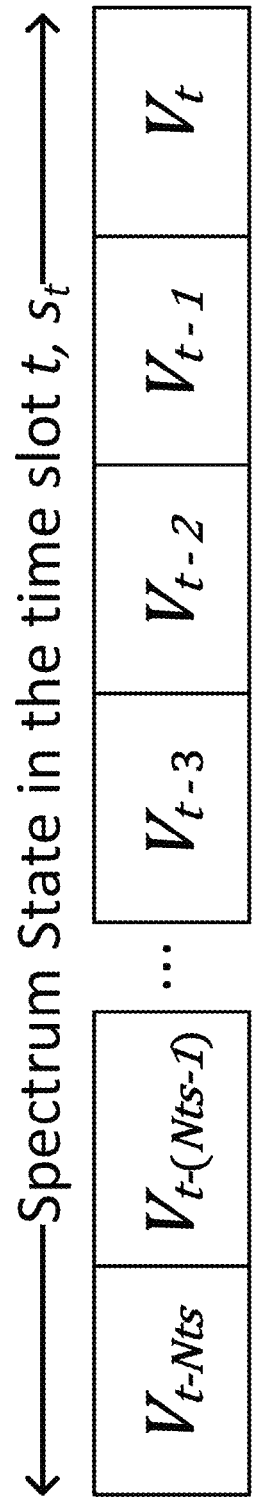
FIG. 4
FIG. 5

METHOD AND APPARATUS FOR ADAPTIVE ANTI-JAMMING COMMUNICATIONS BASED ON DEEP DOUBLE-Q REINFORCEMENT LEARNING

TECHNICAL FIELD OF THE INVENTION

The present invention relates to an adaptive anti-jamming communication system and method in order to enhance the robustness and efficiency of radio communications against various jamming attacks within wireless radio devices and more particularly, within next-generation cognitive radio devices.

REFERENCES CITED

[1] International Journal of Adhoc and Ubiquitous Computing, 2014, vol. 17, no. 4, pp. 197-215, "Jamming and Anti-jamming Techniques in Wireless Networks: A Survey," K. Grover, A. Lim, and Q. Yang.
[2] IEEE Communications Survey & Tutorials, 2009, vol. 11, no. 4, pp. 42-56, "A Survey on Jamming Attacks and Countermeasures in WSNs," A. Mpitziopoulos, D. Gavalas, C. Konstantopoulos, and G. Pantziou.
[3] IEEE Journal on Selected Areas in Communications, 2011, vol. 30, no. 1, pp. 4-15, "An Anti jamming Stochastic Game for Cognitive Radio Networks," B. Wang, Y. Wu, K. J. R. Liu, and T. C. Clancy.
[4] IEEE Wireless Communications, 2018, vol. 25, no. 6, pp. 120-128, "Stackelberg Game Approaches for Anti jamming Defence in Wireless Networks," L. Jia, Y. Xu, Y. Sun, S. Feng, and A. Anpalagan.
[5] International Congress of Information and Communication Technologies (ICICT), 2018, pp. 1023-1031, "Intelligent Anti-jamming Communication based on the Modified Q-learning," C. Han, Y. Niu, T. Pang, and Z. Xia.
[6] IEEE Conference on Communications and Network Security (CNS), 2013, pp. 28-36, "Competing Mobile Network Game: Embracing Anti-jamming and Jamming Strategies with Reinforcement Learning," Y. Gwon, S. Dastangoo, C. Fossa, and H. T. Kung.
[7] IEEE Wireless Communications and Networking Conference (WCNC), 2015, pp. 293-298, "Anti-jamming Transmissions with Learning in Heterogeneous Cognitive Radio Networks," T. Chen, J. Liu, L. Xiao, and L. Huang.
[8] AAAI Conference on Artificial Intelligence, 2016, pp. 2094-2100, "Deep Reinforcement Learning with Double Q-learning," H. V. Hasselt, A. Guez, and D. Silver.
[9] Mathematics of Computation Journal, 1965, vol. 19, no. 90, pp. 297-301, "An Algorithm for the Machine Calculation of Complex Fourier Series," J. W. Cooley and J. W. Tukey.
[10] ASILOMAR, 1997, pp. 877-881, "Automatic Noise Floor Spectrum Estimation in the Presence of Signals," M. J. Ready, M. L. Downey and L. J. Corbalis.
[11] IEEE EUSIPCO, 2020, pp. 1566-1570, "A Deep Double-Q Learning-based Scheme for Anti-Jamming Communications," Phan Khanh Ha Nguyen, Viet Hung Nguyen and Van Long Do.

BACKGROUND OF THE INVENTION

Cognitive Radio (CR) has arisen in recent years as a potential solution to solve the spectrum shortage problem. CR technology allows radio devices to adaptively access channels and thus improves the spectral utilization efficiency. However, along with configurability and cognitive characteristics, CR devices also face with new security issues. Due to the shared and broadcasting nature of radio propagation, along with the development of intelligent jammers recently, radio-jamming attack from smart jammers is one of the most serious threats, which can deteriorate significantly the communication performance of CR devices. Therefore, adaptive anti-jamming communication is a core function of cognitive radio devices. To achieve this target, the radio should have the ability to automatically sensing, analyzing wideband spectrum and select optimal radio operation parameters such as transmission frequency channel, transmission power to effectively deal with complex interference from jammer (jamming resistance) while minimizing the radio power consumption since power is a restricted resource of portable radio devices.

Tradition adaptive anti-jamming communication methods are spread spectrum based-techniques such as Frequency Hopping Spread Spectrum (FHSS), Direct-Sequence Spread Spectrum (DSSS) and Hybrid FHSS/DSSS, which are overviewed in references [1] and [2]. These methods require the usage of very wide spectrum for user radio and thus, are spectral inefficient. Other drawbacks include high-energy cost and high-complexity radio devices. Game theory—a mathematical tool for modelling and analyzing the interaction between jammer has recently been applied to solve the anti-jamming issue with algorithms such as Minimax-Q learning algorithm to solve a stochastic zero-sum game, hierarchical learning algorithm to solve a Stackelberg game and so on, which are described in references [3] and [4].

Reinforcement learning methods based on Q-learning algorithm such as Minimax-Q, Nash-Q, Friend-or-Foe Q and WoLF-Q can also be used to find optimal anti-jamming strategies (see in references [5], [6], and [7]). However, traditional Q-learning algorithm is inefficient when the number of states and actions of the problem is very large.

Deep Reinforcement learning has emerged recently as a powerful framework to tackle decision-making problems in complex environments where the number of states is enormous. Motivated by the success of Deep Double-Q Network (DDQN) in learning optimal policies in video application presented in reference [8], this present invention demonstrates the system and method for generating and implementing an adaptive interference-avoidance strategy based on observed surrounding wideband spectrum for anti-jamming communications in harsh, noisy wireless environments.

BRIEF SUMMARY OF THE INVENTION

This invention presents the system and method for adaptive anti-jamming communications based on Deep Double-Q Reinforcement learning.

In one embodiment, the present invention describes a system of adaptive anti-jamming communication based on Deep Double-Q Reinforcement learning for a user radio comprising three main blocks:
  a Wideband spectrum sensing block, which processes input sampled wideband IQ data of wideband spectrum to determine state and power of all channels in the wideband spectrum and then, from them to generate the spectrum state;
  an Anti-jamming strategy generating block, which trains a prediction Q-neural network using Deep Double-Q Reinforcement learning algorithm to obtain the optimal anti-jamming strategy adapted for various jamming patterns;

an Anti-jamming strategy implementation block, which selects a radio action including transmission channel and transmission power for the user radio based on the anti-jamming strategy retrieved after training process from the anti-jamming strategy generating block.

In another embodiment, a method for adaptive anti-jamming based on Deep Double-Q Reinforcement learning is provided. The method comprises five steps:

First, based on received input sampled wideband IQ data of wideband spectrum, calculating Power Spectrum Density (PSD) and estimating signal detection threshold in wideband spectrum;

Second, determining channel state and normalized channel power of all channels in wideband spectrum;

Third, generating Spectrum Status Vector and Spectrum State of wideband spectrum;

Fourth, training the prediction Q-neural network using Deep Double-Q Reinforcement learning algorithm to generate an anti-jamming strategy that maximizes the successful transmission rate while minimizes the transmission power of user radio;

Fifth, after generating an anti-jamming strategy, the user radio performs this anti-jamming strategy by selecting a transmission frequency channel and transmission power deduced from output of trained prediction Q-neural network when the user radio needs to make its communications.

BRIEF DESCRIPTION OF THE DRAWINGS

FIG. 4 depicts a SSV in a specific time slot in accordance with one embodiment of the invention.

FIG. 5 illustrates the wideband spectrum status in a specific time slot in accordance with one embodiment of the invention.

DETAILED DESCRIPTION OF THE INVENTION

In the following detailed description of the preferred embodiments, reference is made to the associated drawings that form a part hereof, and in which is shown by way of illustration specific embodiments in which the invention may be practiced.

In this present invention, a typical wireless communication model comprises one cognitive user radio (hereinafter referred to as "user radio") including a transmitter-receiver pair and one jammer (jamming transmitter) operating in a shared wideband spectrum (hereinafter referred to as "wideband spectrum") is considered. Without loss of generality, the wideband spectrum can be partitioned into spectrum blocks in both time and frequency. In the time domain, transmission of user radio and jammer occur based on equal time slots. In the frequency domain, the whole wideband spectrum can be divided into N equal non-overlapping frequency channels (hereinafter referred to as "channel(s)"). Each channel i is located at the center frequency $f_i$ with bandwidth $B_i$. At the beginning of each time slot, both user radio and jammer could sense the wideband spectrum thoroughly over a minor duration and then decide which channel is to be used to transmit over the remaining time of the time slot. In each time slot, user radio can operate (transmit and receive) in only one channel while jammer can carry out jamming action in multiple concurrent channels to increase its jamming efficiency. Besides, all radios including user radio and jammer can adjust their power transmission at different power levels in different time slots to increase the radio communication efficiency of user radio or the jamming effectiveness of jammer. A successful communication of user radio occurs if and only if the difference power between it and jammer is greater than or equal to a specified power threshold, i.e, $(p_u - p_j) \geq \beta_{th}$, where $p_u$ is the user radio's transmission power, $p_j$ is the jammer's power and $\beta_{th}$ is a specified power threshold.

The present invention describes a method and apparatus for the user radio in order to obtain an efficient anti-jamming strategy used to select the best available channel in wideband spectrum and utilize the power level as low as possible for its transmission and thus, to achieve the highest communication performance.

Figure 1:
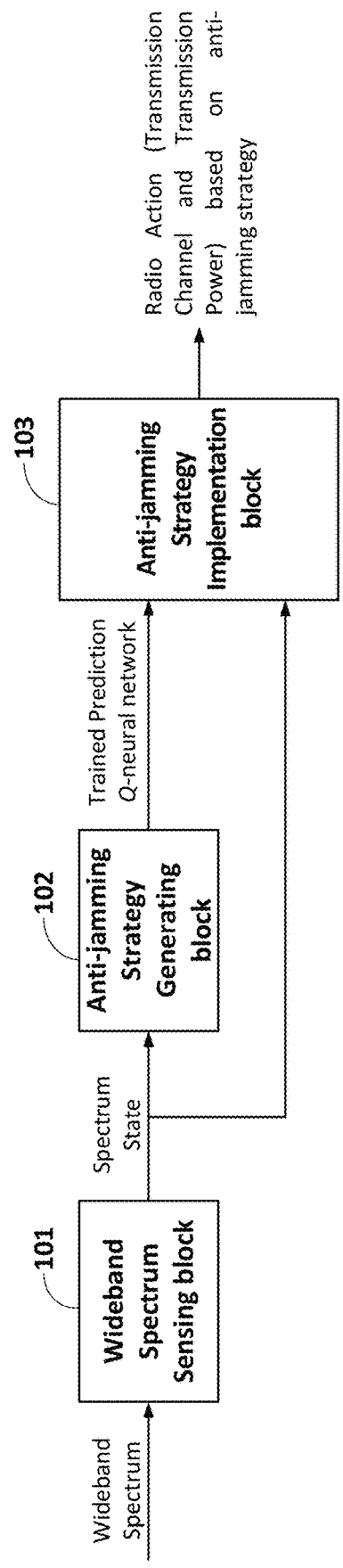
FIG. 1 illustrates a block diagram of an adaptive anti-jamming system based on Deep Double-Q Reinforcement learning in accordance with one embodiment of the invention.

A block diagram of an adaptive anti-jamming communication apparatus based Deep Double-Q Reinforcement learning is shown in FIG. 1. The system comprises three main processing blocks: a wideband spectrum sensing block 101, an anti-jamming strategy generating block 102 and an anti-jamming strategy implementation block 103.

Figure 2:
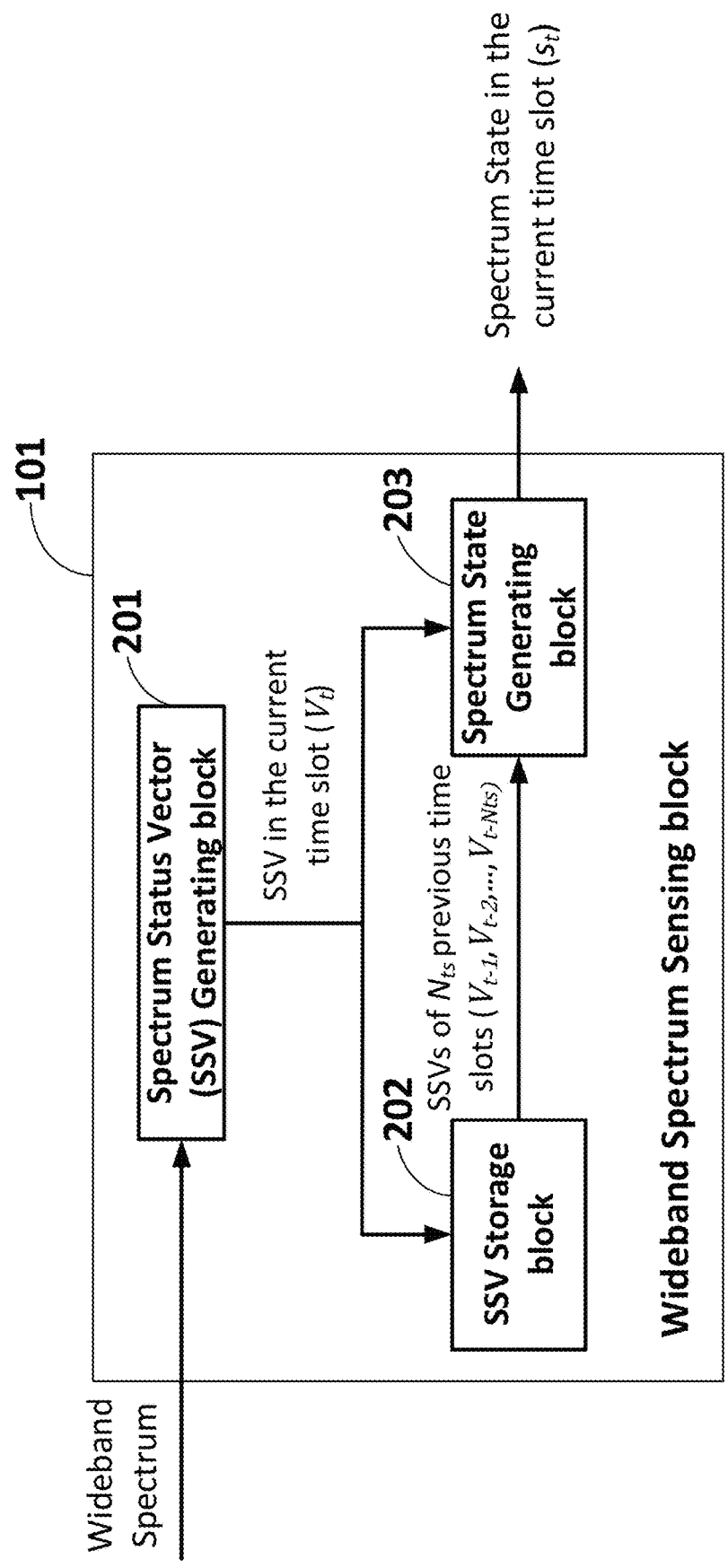
FIG. 2 is a functional and schematic block diagram of wideband spectrum sensing block in accordance with one embodiment of the invention.

Wideband Spectrum Sensing Block:

The function of this block is to analyze, evaluate and derive the wideband spectrum state via received wideband IQ data. Wideband spectrum sensing block receives wideband spectrum information (sampled wideband IQ data) in each time slot, then, carries out its analyzing process and outputs the wideband spectrum state as the input to the anti-jamming strategy generating block as well as the anti-jamming strategy implementation block. Referring to FIG. 2, wideband spectrum sensing block 101 comprises Spectrum Status Vector (SSV) generating block 201, SSV storage block 202 and spectrum state generating block 203.

Figure 3:
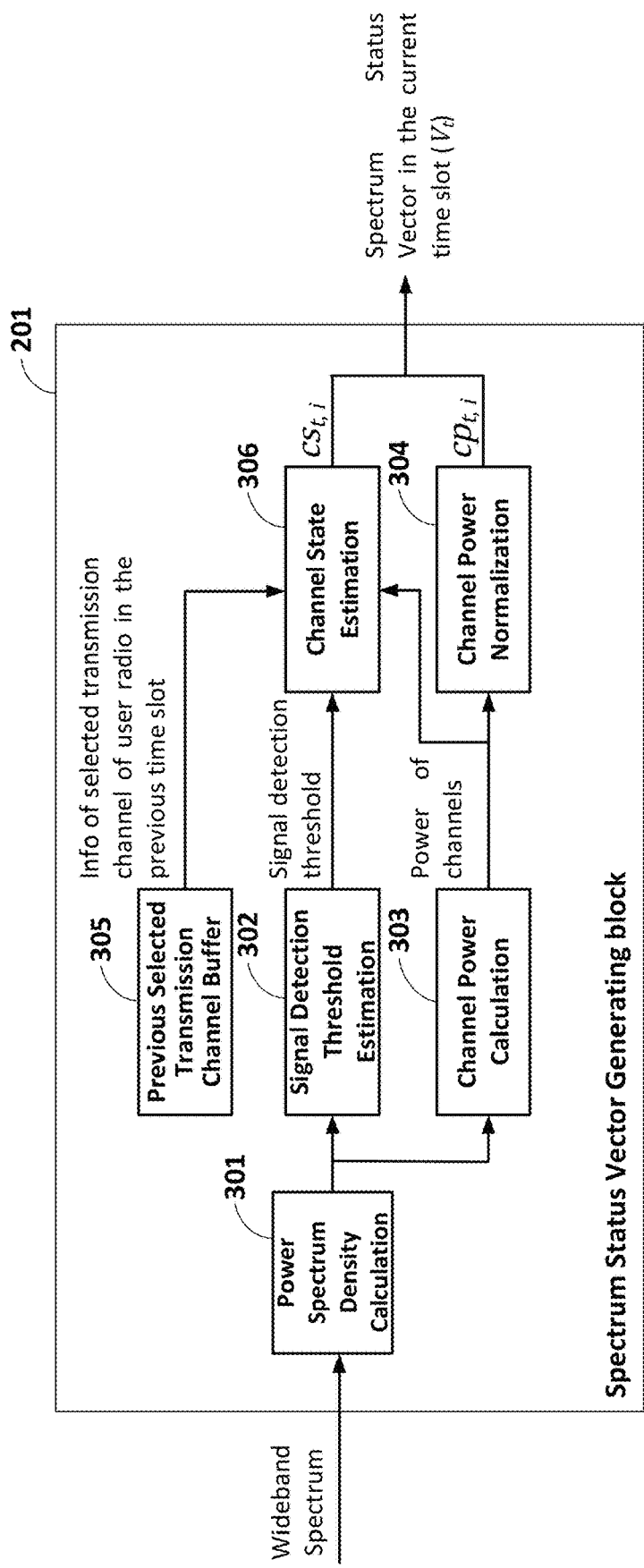
FIG. 3 is a functional and schematic block diagram of Spectrum Status Vector (SSV) generating block in accordance with one embodiment of the invention.

(a) Spectrum Status Vector Generating Block:

First, received analog signal in wideband spectrum data of user radio is sampled to create wideband IQ data. This process is accomplished by using an ADC (Analog-to-Digital Converter) to sample the received signal from user radio's antenna at Nyquist's rate, i.e, the wideband sampling rate is at least two times of the bandwidth of wideband spectrum) and convert wideband analog signal to sampled digital IQ data represented wideband spectrum. Then, received sampled wideband IQ data is processed to give the SSV of current time slot (Vi) which reflects the state (occupied or unoccupied channel) and power of all channels in the current time slot. This SSV of current time slot is stored in the SSV storage block 202 for further processing in the next time slot as well as provided as an input for the Spectrum state generating block 203. The SSV generating block 201 is composed of sub-blocks: Power Spectrum Density (PSD) calculation 301, signal detection threshold estimation 302, channel power calculation 303, channel power normalization 304, previous selected transmission channel buffer 305 and channel state estimation 306 as illustrated in FIG. 3. The structure and function of these sub-blocks are described as follows:

Power Spectrum Density Calculation: this block performs Fast Fourier Transform (FFT) according to equation (1) for sampled wideband IQ data in a specific time slot to get the power spectrum. FFT can be calculated efficiently and very fast by a method proposed in the article [9] "An Algorithm for the Machine Calculation of Complex Fourier Series") of J. W. Cooley and J. W. Tukey published in the Mathematics of Computation Journal, 1965, vol. 19, no. 90, pp. 297-301. Based on the result of FFT, PSD of wideband spectrum is simply inferred in linear scale and logarithmic scale as shown in equations (2) and (3), respectively. Output calculated PSD of this block will be the input for signal detection threshold estimation block 302 and channel power estimation block 303.

$$Power_{linear}[k] = \left| \sum_{n=1}^{L-1} s[n] \times e^{-\frac{j2\pi kn}{N_{FFT}}} \right|^2 \quad (1)$$

$$PSD_{linear}[k] = \frac{Power_{linear}[k]}{(F_S \times N_{FFT})} \quad (2)$$

$$PSD_{dBm}[k] = 10 \times \log10(PSD_{linear}[k]) + 30 \quad (3)$$

where $s[71]$ is sampled wideband IQ data; $k=0, 1, \ldots, L-1$; $L$ is the number of wideband IQ data samples taken in the minor duration at the beginning of each time slot used for wideband spectrum sensing; $F_s$ is the wideband sampling rate and $N_{FFT}$ is the number of FFT points for FFT calculation.

Signal Detection Threshold Estimation: Based on calculated PSD of wideband spectrum, a threshold for signal detection is estimated by this block. In order to determine the detection threshold, first, the noise floor of wideband spectrum is estimated via an image-processing based-noise floor estimation algorithm proposed in the article [10] "Automatic Noise Floor Spectrum Estimation in the Presence of Signals" of M. J. Ready, M. L. Downey and L. J. Corbalis published in the Proceeding of ASILOMAR, 1997, pp. 877-881. Since received signals in wireless environment often fluctuate rapidly and the noise estimation process in wideband spectrum usually does not achieve high accuracy, instead of using directly the estimated noise floor to detect signals, the signal detection threshold is defined as the estimated noise floor plus a predefined offset in logarithmic scale (dB). In a channel, if the PSD accumulation of all frequency components of a channel is greater than the signal detection threshold, it will be inferred that signal appears and this channel is occupied.

Channel Power Calculation and Channel Power Normalization: Along with signal detection threshold, the power of all N channels in the wideband spectrum is also calculated based on PSD of wideband spectrum by accumulating PSD values of all corresponding frequency components (bins) in each channel. Channel power calculation block plays this role. Then, the power of channels are normalized to a same range from −1 to 1 by the channel power normalization block. This normalization process is required for the training and inferring process of the Q-neural network processing after. The output of this block is the normalized channel power for all channels in the wideband spectrum in the time slot t.

Previous Selected Transmission Channel Buffer: the function of this buffer is to save information about user radio's transmission channel selection in a previous time slot. One embodiment of this buffer could be a RAM (Random-Access Memory). This information about previous selected transmission channel of user radio is acquired from the anti-jamming strategy generating block 102 in the strategy-generating phase or from the anti-jamming strategy implementation block 103 in the strategy implementation phase. A channel, which is used by user radio in the previous time slot, should be discriminated from other channels interfered by jammer and considered as an unoccupied channel in this current time slot. Therefore, the channel state estimation block 306 uses the information about previous selected transmission channel stored in this buffer to determine the channel state of all channels in the wideband spectrum in the current time slot.

Channel State Estimation: this block estimates the channel state of all channels in wideband spectrum in the current time slot, based on calculated powers, signal detection threshold and user radio's channel selection in the previous time slot provided by the channel power calculation/normalization block, the signal detection threshold estimation block and the previous selected transmission channel buffer, respectively.

A SSV in the time slot t, $V_t$ is formed by the combination of channel state and normalized channel power of all channels in the wideband spectrum as shown in FIG. 4.

(b) SSV Storage Block:

Since the radio propagation environment usually changes quickly, the wideband spectrum should be observed and analyzed for a long time to have a good insight about surrounding wireless conditions. Therefore, instead of using one instant SSV in a time slot, SSVs in multiple consecutive time slots are saved to a buffer and analyzed at the same time to deduce the spectrum state. This function is implemented by the SSV Storage block 202. One embodiment of SSV storage block is a FIFO (First-In, First-Out) memory, which keeps $N_{ts}$ SSVs corresponding to $N_{ts}$ previous consecutive time slots. Thus, the size of SSV Storage block is fixed at $N_{ts}$ elements, when the SSV Storage block size reaches $N_{ts}$, before a new SSV is pushed in SSV storage block, the oldest SSV should be removed from SSV storage block.

(c) Spectrum State Generating Block:

Spectrum state generating block 203 creates a spectrum state $s_t$ in a time slot t by concatenating SSV in the current time slot t and $N_{ts}$ SSVs in the previous consecutive time slots, i.e., from t−1 to t−$N_{ts}$. It can be seen in FIG. 5, a spectrum state in the time slot t, $s_t$ is defined as a stack of SSVs in $N_{ts+1}$ time slots. Output spectrum state generated by the spectrum state generating block is used by the anti-jamming strategy-generating block to deduce the anti-jamming strategy in the training phase as well as by the anti-jamming strategy implementation block to issue radio action in the implementation phase.

Figure 6:
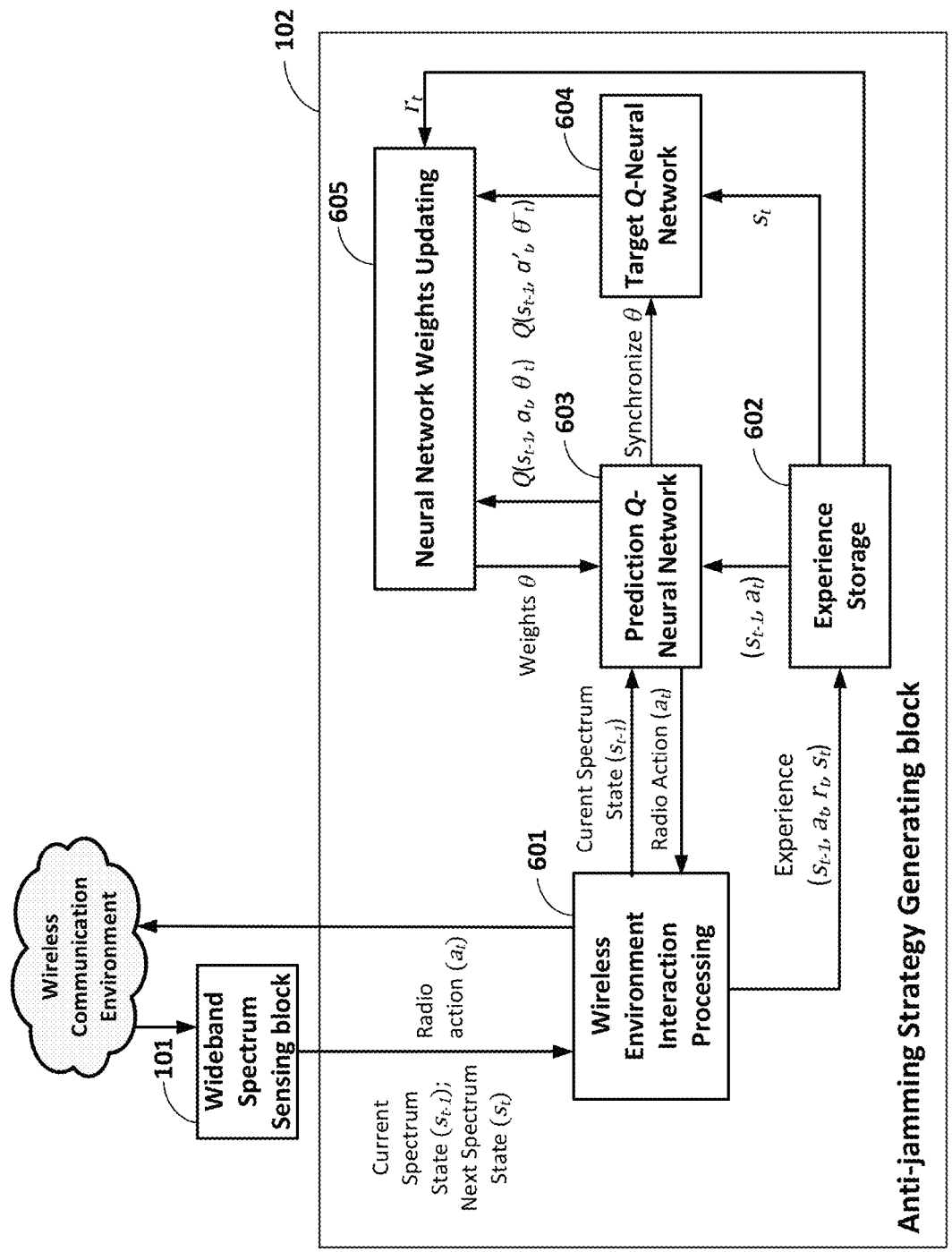
FIG. 6 is a functional and schematic block diagram of the anti-jamming strategy-generating block in accordance with one embodiment of the invention.

Anti-Jamming Strategy Generating Block:

An implementation of the anti-jamming strategy generating block 102 is illustrated in FIG. 6. This block trains Q-neural network in order to find the optimal anti-jamming strategy through the interaction with surrounding wireless environment over a numerous training time slots. The required number of time slots used for training process should be large enough to ensure the algorithm could converge and an efficient anti-jamming strategy is found.

Anti-jamming strategy generating block comprises of five sub-blocks: wireless environment interaction processing 601, experience storage 602, two Q-neural networks: prediction Q-neural network 603 and target Q-neural network 604 and neural network weights updating 605.

The anti-jamming strategy generating block uses Double-Q neural network architecture adapted the idea proposed in the article named "Deep Reinforcement Learning with Double Q-learning," of H. V. Hasselt, A. Guez, and D. Silver published in the Proceedings of AAAI Conference on Artificial Intelligence, 2016, pp. 2094-2100 [8]. The Double-Q neural network architecture comprises two Q-neural networks: a prediction Q-network 603 is used for selecting an action and another target Q-network 604 is used for evaluating actions.

Figure 7:
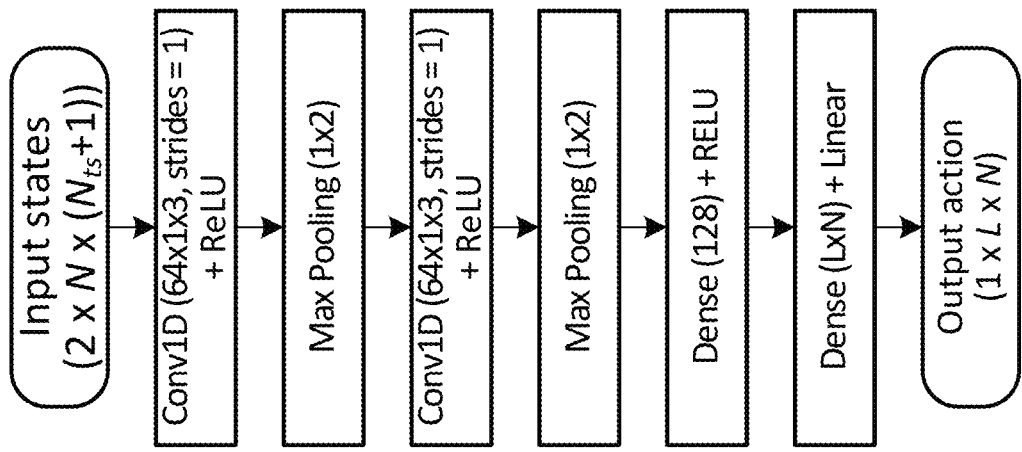
FIG. 7 illustrates an architecture of Q-neural network used in the anti-jamming strategy generating block and anti-jamming strategy implementation block in accordance with one embodiment of the invention.

These Q-neural networks adopts a same Convolutional Neural Network (CNN) architecture shown in FIG. 7. The network's architecture includes eight layers: one input layer comprises spectrum states of the current time slot and the previous time slot, which can be represented as a vector of length $2 \times N \times (N_{ts}+1)$; two convolutional 1D layers along with two max-pooling layers following by two dense layers; one output layer is a vector of size $1 \times (L \times N)$, where L is the number of discrete power transmission levels available for user radio and N is the number of channels in wideband spectrum. The output of neural network contains approximated values of state-action Q-function in accordance with the input state and all ($L \times N$) possible radio actions (a radio action is defined as a combination of a selected transmission channel and a transmission power level for user radio). The optimal radio action for anti-jamming is the action that has the maximum approximated value of Q-function represented in the output vector of neural network.

The objective of the training process for the prediction Q-neural network 603 in each time slot t is to select a specific radio action $a_t$ in the action space A ($a_t \in A$) such that maximize the expected accumulated future reward $E_\pi[\sum_{t=0}^{\infty} \gamma^t r_t | s_0 = s]$ for all initial states in the state space $s \in S$, where $\pi$ is a selection strategy for action. This goal can be achieved via finding the optimal state-action value function $Q^*(s, a)$ which is defined according to:

$$Q^*(s, a) = \max_\pi E\left[\sum_{t=0}^{\infty} \gamma^t r_t \,\Big|\, s_0 = s, a_0 = a\right],$$

for $s \in S$, $a \in A$. In the anti-jamming problem, since the number of wireless spectrum environment states (the state space) is very large, instead of applying traditional Q-learning method, which creates a predefined lookup Q-table to select the best action, the prediction Q-neural network is used to represent an approximation of optimal Q-function.

In each time slot, the predict Q-neural network gives a radio action $a_t$ using $\varepsilon$-greedy selection policy, i.e, with a probability of $\varepsilon$, selecting randomly an action in the action space, otherwise, select an action in the action space that has the maximum state-action value $Q^*(s, a)$. After selecting a radio action (including transmission channel and power), user radio reconfigures its hardware to make communication using this selected transmission channel and power level. The communication of user radio is affected by wireless environment with jammer. Therefore, a wireless environment interaction processing block 601 plays a crucial role to handle the interaction process between user radio and wireless environment. The function of block is to collect spectrum states from wideband spectrum sensing block 101 and check whether the communication of user radio is successful or failed (jammed) in this time slot in order to calculate the reward gained by user radio in this time slot, $r_t$. The reward is defined by a reward function as follows:

```
if (∃ channel i such that c_{t+1,i} = 0)
    if (u = i) then
        if (p_u = p_l | l = 0) then r_t = 1.0
        else if (p_u = p_l | l = 1) then r_t = 0.5
        else if (p_u = p_l | 1 < l < L − 1) then r_t = 0.05
    else r_t = 0
    end if
else
    if ((p_u = p_l | l = l_{min}) such that (p_u − p_j) ≥ β_{th} then r_t = 1.0
    else r_t = 0
    end if
end if
``` where L is the number of different available discrete transmission power levels of user radio, $p_l$ is a transmission power of user radio (l=0, 1, . . . , L−1); $p_u$ and $p_j$ is the transmission power of user radio and jammer, respectively; u is the selected channel of user radio for transmission in the next time slot t+1 and $c_{t+1,i}=0$ means channel state i is vacant (non-occupation by jammer) in the next time slot t+1.

The objective of reward function is to maximize the successful transmission probability while keep the power consumption of user radio as low as possible. The idea is user radio should try to choose an unoccupied channel (jamming-free) for its transmission if this channel exists in this time slot. However, in case there is no such available vacant channel, user radio is forced to transmit on a jammed channel but it should try to utilize a suitable lowest power level but greater than jammer's power to ensure its communication will be successful.

Wireless environment interaction processing block also receives the spectrum state in the next time slot after user radio implement its selected radio action $a_t$ and wideband spectrum sensing block is executed again to obtain the spectrum state. A quartet $(s_{t-1}, a_t, r_t, s_t)$ is called an experience. Experiences are saved in a replay memory of an experience storage block 602. When the size of the replay memory is big enough, a mini-batch B containing k experiences is randomly sampled from the replay memory. Weights $\theta_t$ of prediction Q-neural network is updated according to the gradient-descent algorithm in order to minimize the loss function $L(\theta_t)$ as follows:

$$L(\theta_t) = \frac{1}{k}\sum_{t \in B} (r_t + \gamma Q(s_t, \mathrm{argmax}_a Q(s_t, a, \theta_t), \theta_t^-) - Q(s_{t-1}, a_t, \theta_t))^2 \quad (5)$$

where $\gamma$ is the discount factor specified the importance of future reward. The discount factor is a real number in the interval (0,1) and the smaller the discount factor is, the least important the future reward is. In order to synchronize two Q-neural network, after a period of training, the updated weights $\theta$ of the prediction Q-neural network are copied to weights $\theta^-$ of the target Q-neural network.

After training process, output of anti-jamming strategy generating block is the trained weights $\theta$ of prediction Q-neural network, which minimizes the loss function $L(\theta_t)$. The predict Q-neural network after training phase can generate an optimal anti-jamming strategy by reasoning out the most appropriate radio action based on input spectrum state to be used in the implementation phase.

Figure 8:
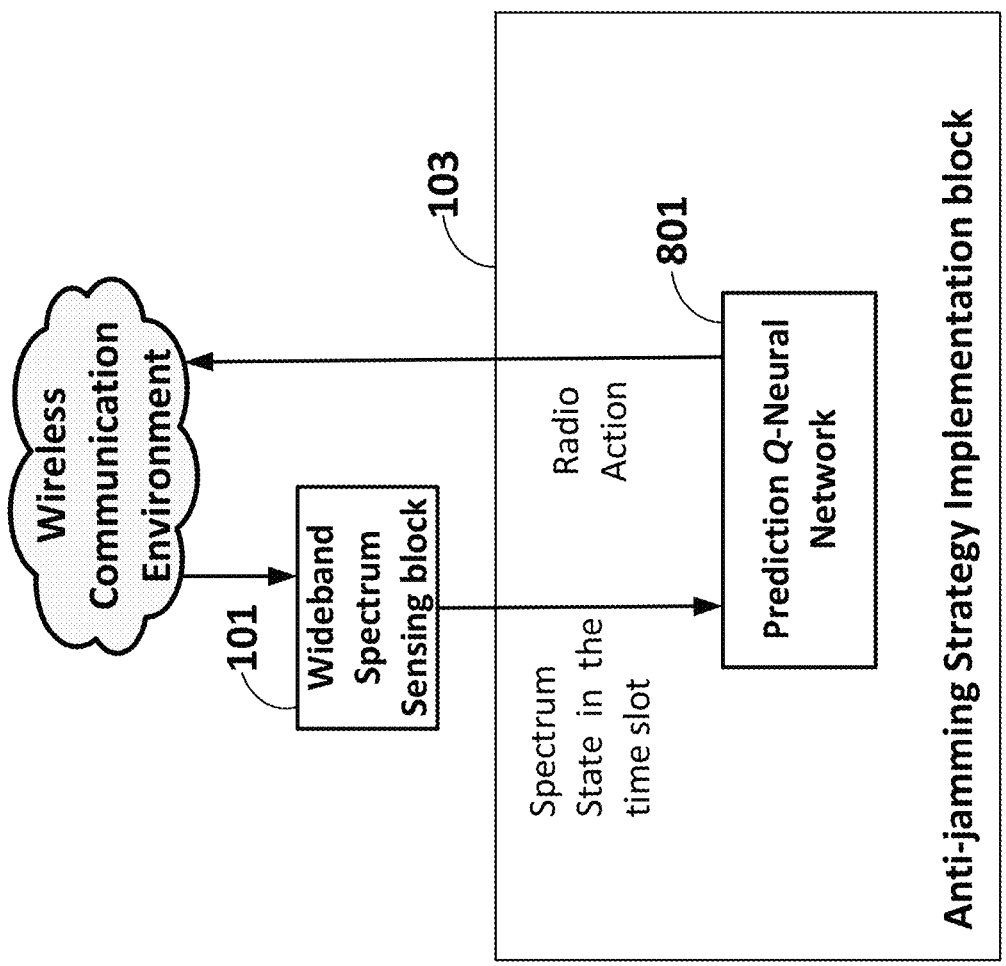
FIG. 8 is a functional and schematic block diagram of the anti-jamming strategy implementation block in accordance with one embodiment of the invention.

Anti-Jamming Strategy Implementation Block:

An implementation of anti-jamming strategy Implementation block 103 is illustrated in FIG. 8. The function of anti-jamming strategy implementation block is to provide a suitable anti-jamming radio action including transmission channel and transmission power in each time slot for user radio based on a generated anti-jamming strategy. This function is accomplished by implementing a trained predict Q-neural network after the training process of the anti-jamming strategy generating block 102. In each time slot, the input for this trained predict Q-neural network is the spectrum state derived from wideband spectrum sensing block 101, an optimal radio action is deduced based on the output of the prediction Q-neural network and the user radio just applies this suggested radio action for its communication in this time slot.

A method for adaptive anti-jamming communication based on Deep Double-Q reinforcement learning comprises five steps: step 1: calculating PSD of all channels and estimating signal detection threshold in wideband spectrum; step 2: determining the channel state and normalized channel power of all channels in wideband spectrum; step 3: generating spectrum status vector and spectrum state of wideband spectrum; step 4: generating anti-jamming strategy by training the prediction Q-neural network over a predefined period of training time slots; step 5: implementing anti-jamming strategy by selecting the radio action (transmission channel and transmission power) derived from output of trained prediction Q-neural network.

Step 1: Calculating PSD of all Channels and Estimating Signal Detection Threshold in Wideband Spectrum.

User radio samples received analog signal to get sampled wideband IQ data represented wideband spectrum.

Wideband IQ data is fed into PSD calculation block 301 to calculate PSD based on performing Fast Fourier Transform according to equation (1).

The calculated PSD is then fed into signal detection threshold estimation block 302. This block applies a well-known noise floor estimation algorithm based on morphology image-processing techniques [10] to estimate the noise floor in wideband spectrum. The signal detection threshold is determined by adding the noise floor with a predefined offset value configured by the signal detection threshold estimation block.

Step 2: Determining the Channel State and Normalized Channel Power of Channels in Wideband Spectrum.

Power of each channel in wideband spectrum is calculated in the channel power calculation block 303 by accumulating PSD values of all frequency bins in that channel. Then, the calculated power of each channel is normalized by the channel power normalization block 304 to a same value range from −1 to 1 using the maximum and minimum channel power in a channel that user radio can receive. Those values can be determined simply based on the sensitivity and the dynamic range of the user radio's receiver.

Channel state of each channel in wideband spectrum is determined by the channel state estimation block 306. This block reasons out the state of a channel based on inputs such as its power (before normalization process), signal detection threshold and the selected transmission channel of user radio in the previous time slot. The channel is evaluated as unoccupied or occupied in the current time slot thanks to the comparison between channel power and signal detection threshold: if the channel power is greater than signal detection threshold, that channel is occupied in time slot t; otherwise, that channel is unoccupied in time slot t. Besides, combining with information about previous channel selection in one time slot before, the channel state estimation block can describe the state of each channel i in wideband spectrum in a time slot t, $cs_{t,i}$, as follows:

$$cs_{t,i} = \begin{cases} 0, \text{ if channel } i \text{ is unoccupied in } t \text{ and the previous channel selection in } t-1 \text{ is not } i \\ 1, \text{ if channel } i \text{ is occupied in } t \text{ and the previous channel selection in } t-1 \text{ is not } i \\ 2, \text{ if the previous channel selection in } t-1 \text{ is } i \end{cases} \quad (6)$$

Step 3: Generating Spectrum Status Vector and Spectrum State of Wideband Spectrum SSV generating block 201 creates SSV for wideband spectrum in time slot t by aggregating channel states and normalized channel powers of all N channels in the wideband spectrum to a vector of length 2×N as demonstrated in FIG. 4. The SSV is saved to the SSV storage block 202 in order to be used in next time slots. Besides, SSV is also provided for spectrum state generating block 203 to generate spectrum state. Spectrum state generating block 203 combines SSV of the current time slot with $N_{ts}$ SSVs of consecutive previous time slots retrieved from SSV storage to create a stack of ($N_{ts}$+1) SSVs, which is defined as the spectrum state in the current time slot t. Spectrum state is the output of the wideband spectrum sensing block 101, which is used by both the anti-jamming strategy generating block 102 for strategy learning process and anti-jamming strategy implementation block 103 for strategy implementation process.

Step 4: Generating Anti Jamming Strategy by Training Prediction Q-Neural Network Over a Predefined Period of Training Time Slots Training process for Q-neural network is performed by Anti-jamming Strategy-Generating block 102. Training algorithm is a Deep Double-Q Reinforcement Learning algorithm, which is motivated by the idea proposed in [8]. Algorithm 1 describes the details of training algorithm:

defined by the reward function (4) and also collect the next spectrum state from wideband spectrum sensing block 101. The experience in this training time slot, i.e., a quartet (current spectrum state, radio action, reward and next spectrum state), is saved to the experience storage block 602.

When the number of experience in the experience storage block is large enough, a mini-batch of experience is randomly samples as input to the training process of Q-neural network. First, the loss function is calculated; then, thanks to the well-known gradient-descent algorithm and back-propagation algorithm, weights of prediction Q-neural network are updated in order to minimize the loss function defined in equation (5). After a predefined number of training time slots, weights of target Q-neural network are synchronized with those of prediction Q-neural network. The aforementioned processing is carried out by the Neural Network Weights Updating block 605.

Over a long enough training time slots to guarantee the Deep Double-Q Reinforcement learning algorithm could be converged, user radio obtains a prediction Q-neural network with trained weights, which is capable of reasoning out an optimal anti-jamming strategy, i.e., suggesting an adaptive anti-jamming radio action for user radio in correspondence with various input spectrum states.

---

Algorithm 1: Training algorithm for the prediction Q-neural network based on Deep Double-Q Reinforcement learning

---

Input: number of training time slots T, update target Q-neural network period U, number of stacked SSV $N_{ts}$, mini-batch size k, discount factor γ, learning rate α.
Output: weights θ of the prediction Q-neural network
1:    Initialize experience replay memory M = Ø, exploration rate ε = $ε_0$
2:    Initialize prediction Q-neural network and target Q-neural network with
      random weights θ and $θ^-$, respectively
3:    Initialize empty for initial spectrum state $s_0$ = queue{$ssv_i$}, with i = 0,1,2, ..., $N_{ts}$
4:    Observe spectrum to get first spectrum status vector $ssv_0$ and create the first
      spectrum state: $s_0$ = $s_0$.Enqueue($ssv_0$)
5:    for t = 0 to T do
6:       With probability ε, select randomly an action $a_t$∈A; otherwise select an
       action $a_t$ = $argmax_{a'}Q_θ(s_{t-1}, a')$
7:       Execute action $a_t$ and collect reward $r_t$ according to reward function (4)
8:       Observe spectrum to get $ssv_t$ and next spectrum state $s_t$ = $s_{t-1}$.Enqueue($ssv_t$)
9:       if (t ≥ $N_{ts}$) then
10:      Store experience ($s_{t-1}$, $a_t$, $r_t$, $s_t$) in memory M
11:     end if
12:     if (t ≥ k + $N_{ts}$ + 1) then
13:       ε = $ε_0$(T - t)/T
14:       Sample randomly from M a mini-batch B containing k experiences:
        {($s_{t-1}$, $a_t$, $r_t$, $s_t$)}, t ∈ B
15:       Calculate loss function L($θ_t$) according to equation (5)
16:       Update $θ_t$ with learning rate α to minimize L($θ_t$)
17:       After each U time slots, update $θ_t^-$ = $θ_t$
18:     end if
19:    end for

---

At the beginning, the replay memory of experience storage block 602 is set empty. Weights of prediction Q-neural network and target Q-neural network are initialized randomly. Initial SSV and spectrum state are set empty. In each time slot during the training period, the wireless environment interaction processing block 601 obtains current spectrum state derived from wideband spectrum sensing block 101. Based on this information, a radio action is provided by the prediction Q-neural network 603. Then, the wireless environment interaction processing block 601 calculates a reward Step 5: Implementing Anti Jamming Strategy by Selecting a Radio Action (Transmission Channel and Transmission Power) Derived from Output of Trained Prediction Q-Neural Network.

The anti-jamming strategy implementation block 103 realizes the anti-jamming communication after the training process accomplished in the anti-jamming strategy generating block 102. At each time slot, spectrum state is fed into the anti-jamming strategy implementation block. This block will select a corresponding radio action (transmission channel and transmission power), which makes the Q-function approximated by output of the trained prediction Q-neural network reaching the maximum value. This selected radio action is the optimal anti-jamming strategy for user radio to achieve the jamming-free communication as well as lowest transmission power consumption.

While embodiments of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A system for adaptive anti-jamming communication based on Deep Double-Q Reinforcement learning for a user radio operated in a wideband spectrum with a jammer, where the wideband spectrum is partitioned into spectrum blocks in both time, time slots, and frequencies, wherein the system comprises:
a wideband spectrum sensing block, which further comprises:
a spectrum status vector (SSV) generating block, a SSV storage block and a spectrum state generating block, the wideband spectrum sensing block samples a received analog signal to obtain a wideband IQ data of wideband spectrum, then based on the wideband IQ data of the wideband spectrum, calculates power spectrum density, estimates a signal detection threshold, calculates power of all channels in the wideband spectrum to generate a spectrum state vector in a current time slot, based on spectrum state vectors in the current time slot and a number of previous time slots, this block produces a spectrum state in the current time slot;
an anti-jamming strategy-generating block, further comprising:
a wireless environment interaction processing block, an experience storage block, a prediction Q-neural network, a target Q-neural network and a neural network weights updating block, the wireless environment interaction processing block obtains spectrum states in the current time slot and in a next time slot from the wideband spectrum sensing block, configures the user radio to carry out a radio action, communication using a selected transmission channel and transmission power, calculates a reward using a predefined reward function and saves the spectrum states, the radio action and the reward to a memory in an experience storage block, the prediction Q-neural network is used for selecting actions while the target Q-neural network is used for evaluating actions, both neural networks have a same network architecture including 8 layers: one input layer is a vector of size $2 \times N \times (N_{ts}+1)$, where N is the number of channels in the wideband spectrum, $N_{ts}+1$ is the number of SSVs of the spectrum state, two convolutional 1D layers along with two max-pooling layers following by two dense layers and one output layer is a vector of size $1 \times N \times L$, where L is the number of available discrete transmission power levels of the user radio, the neural network weights updating block calculates a defined loss function and updates weights of two neural networks in order to minimize the loss function to maximize the expected accumulated reward defined by the specific reward function, thereby achieving an anti-jamming strategy;
an anti-jamming strategy implementation block, wherein the anti-jamming strategy implementation block decides radio action, transmission channel and transmission power, for the user radio after a training process is done in the anti-jamming strategy-generating block, the anti-jamming strategy implementation block comprises the prediction Q-neural network with weights that are trained completely by the anti-jamming strategy generating block, input of the prediction Q-neural network is the spectrum state in a time slot, output of the prediction Q-neural network is a vector representing the approximated Q-function values for all possible radio actions of the user radio, the jamming anti-jamming strategy implementation block selects the radio action, including transmission channel and transmission power of the user radio, in the current time slot, which has a maximum approximated Q-function as an optimal action and is used by the user radio for anti-jamming communication.

2. The system of claim 1 where the spectrum state generating block comprises sub-blocks:
a power spectrum density calculation block: calculates power spectrum density of received wideband IQ data of wideband spectrum using Fast Fourier Transform;
a signal detection threshold estimation block: receives calculated power spectrum density from the power spectrum density calculation block and estimates the signal detection threshold based on noise floor estimation techniques for wideband spectrum;
a channel power calculation block: receives calculated power spectrum density from the power spectrum density calculation block and calculates power of each channel in wideband spectrum by accumulating power spectrum density values of all frequency bins in correspondence with each channel;
a channel power normalization block: normalizes powers of all channels in the wideband spectrum to a similar range from −1 to 1;
a previous selected transmission channel buffer: plays role as a memory to save information about the selected transmission channel of the user radio's radio action in a previous time slot, the information is provided for a channel state estimation block to generate the spectrum status vector;
the channel state estimation block: reasons out the state for all channels in wideband spectrum based on inputs including the power of all channels, the signal detection threshold and the selected transmission channel or the user radio in the previous time slot received from the channel power calculation block, the signal detection threshold estimation block and the previous selected transmission buffer, respectively.

3. A method for adaptive anti-jamming communication based on Deep Double-Q Reinforcement learning, wherein the method comprises:
calculating a power spectrum density and estimating a signal detection threshold in a wideband spectrum;
determining a channel state and a normalized channel power of all channels in the wideband spectrum; wherein for each channel in the wideband spectrum, based on the calculated power spectrum density, calculating the channel power by accumulating power spectrum density values of frequency bins in each channel, then normalizing the channel power to a same range from −1 to 1 to get the normalized channel power, comparing the calculated channel power with the signal detection threshold and combining with information about previous selected channel selection of a user radio to generate the channel state;

generating a spectrum status vector and a spectrum state of the wideband spectrum in a time slot; wherein the spectrum status vector in a time slot is a combination of channel states and normalized channel powers of all channels in the wideband spectrum and the spectrum state of the wideband spectrum in a time slot is a combination of multiple spectrum state vectors including spectrum state vector in a current time slot and a specific number of previous time slots, time slots before the current time slot;

generating an anti-jamming strategy by the training prediction Q-neural network of claim 1 over a predefined training period including a predefined number of time slots to find the optimal Q-neural network's weights; wherein, in each time slot in the said training period, experience, which is a quartet including the spectrum state in said time slot, a radio action given by the prediction Q-neural network, a reward calculated by a predefined reward function and spectrum state after the user radio realizes said radio action is saved to an experience storage, when the experience storage reaches a specific number of stored experiences, a subset of experience is sampled randomly from the storage and used for training the Q-neural network, the training includes calculating a predefined loss function and updating weights of the prediction Q-neural network in each time slot in the training period in order to minimize the loss function as well as copying the weights of the prediction Q-neural network to the target Q-neural network after a predefined number of time slots to synchronize two said Q-neural networks;

selecting a radio action including a transmission channel and a transmission power derived from an output of the trained prediction Q-neural network after the aforementioned training process, the said radio action, which has a maximal value of an approximated Q-function given by the trained prediction Q-neural network, is selected as an optimal action and the user radio utilizes said optimal action for its communication in order to accomplish adaptive anti-jamming.

* * * * *